(12) United States Patent
Ricke et al.

(10) Patent No.: US 7,195,266 B2
(45) Date of Patent: Mar. 27, 2007

(54) KINGPIN ASSEMBLY FOR A THREE-WHEELED AGRICULTURAL APPLICATOR

(75) Inventors: Keith M. Ricke, Willmar, MN (US); Rex L. Ruppert, Benson, MN (US)

(73) Assignee: CNH America LLC, Racine, WI (US)

( * ) Notice: Subject to any disclaimer, the term of this patent is extended or adjusted under 35 U.S.C. 154(b) by 347 days.

(21) Appl. No.: 10/882,892

(22) Filed: Jul. 1, 2004

(65) Prior Publication Data

US 2006/0000397 A1 Jan. 5, 2006

(51) Int. Cl.
*B62K 1/00* (2006.01)
*B62K 17/00* (2006.01)
*B62K 21/00* (2006.01)
*B62M 11/00* (2006.01)
*B62M 13/00* (2006.01)

(52) U.S. Cl. ..................................... 280/280
(58) Field of Classification Search ................ 280/279, 280/280; 16/18 R–44, 18 A
See application file for complete search history.

(56) References Cited

U.S. PATENT DOCUMENTS

2005/0087944 A1* 4/2005 Higgins ................. 280/33.991

OTHER PUBLICATIONS

AGCO, Terra-Gator 4-Wheel Applicator Chassis Sales Brochure, Aug. 2003, all pages.
AGCO, Terra-Gator 3-Wheel Applicator Chassis Sales Brochure, all pages.
Agchem, Terra-Gator 8144 & 8104 Sales Brochure, all pages.
Agchem, Terra-Gator 8103 Sales Brochure, all pages.
Agchem, Terra-Gator 1903 Sales Brochure, all pages.
Agchem, Terra-Gator 1803 Sales Brochure, all pages.
Agchem, Terra-Gator 1603T Sales Brochure, all pages.
Agchem, Terra-Gator 1803 info request, all pages.
Agchem, Terra-Gator 1903 info request, all pages.
Agchem, Terra-Gator 8104 Sales Brochure, all pages.

* cited by examiner

*Primary Examiner*—Christopher J. Novosad
(74) *Attorney, Agent, or Firm*—Rebecca Henkel

(57) ABSTRACT

A frame assembly is configured to enhance control and maneuverability of a three-wheeled agricultural applicator. The frame assembly includes a fork assembly mounted on a single front wheel assembly having a single front floatation tire. The front floatation tire generally includes a tread having a central crown, a first tread face extending in one direction from the crown, and a second tread face extending in a second direction from the crown opposite the first tread face. The frame assembly includes a spindle housing having an opening with a central axis aligned at an angle from vertical and configured to receive a kingpin extending upward from the fork assembly. When turning the agricultural applicator at a turn angle from a straight-forward direction of travel, the angle of the kingpin causes the vertical alignment of the crown of the front tire to roll a roll angle from vertical.

13 Claims, 2 Drawing Sheets

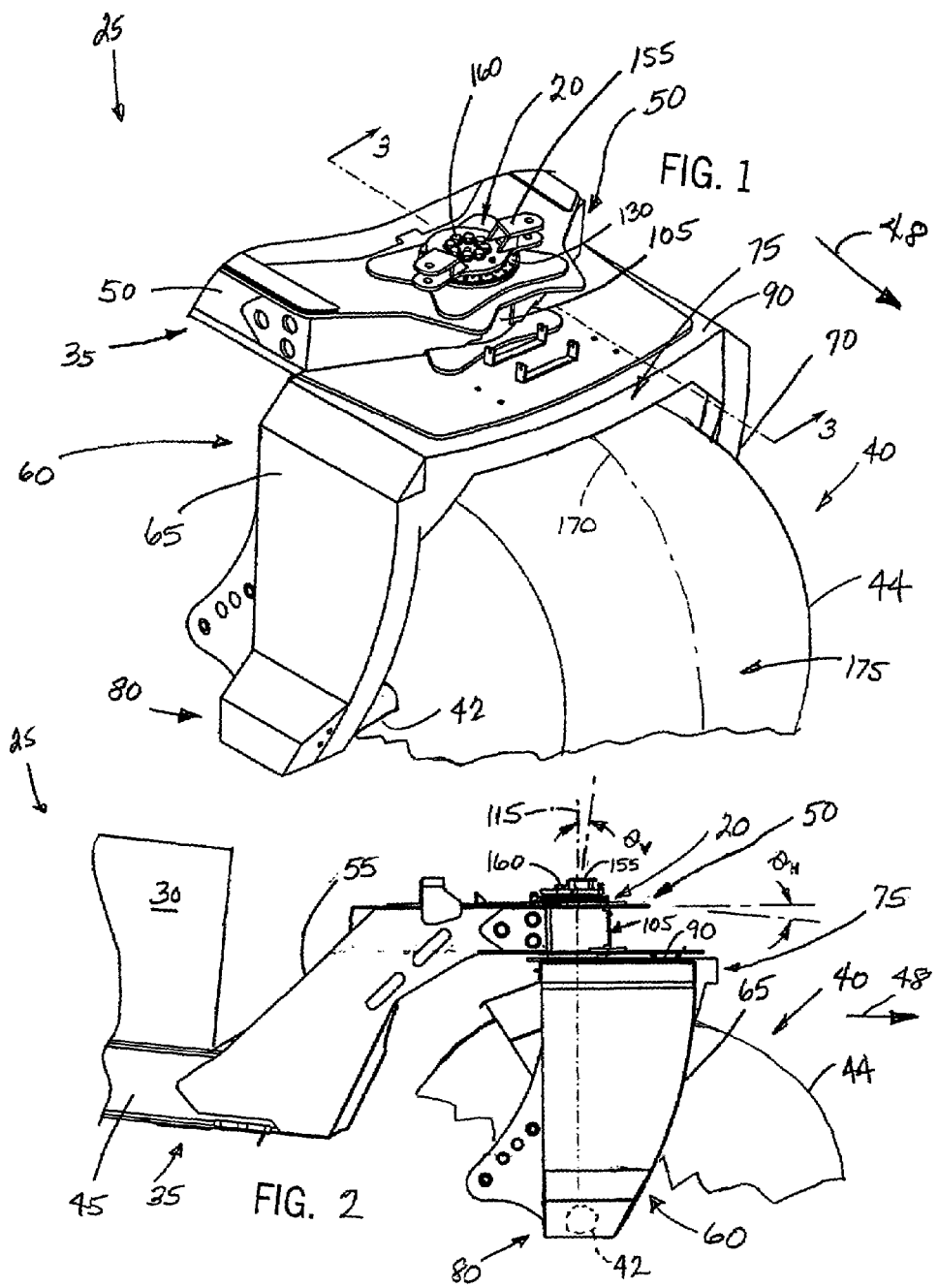

KINGPIN ASSEMBLY FOR A THREE-WHEELED AGRICULTURAL APPLICATOR

FIELD OF THE INVENTION

The invention relates to an agricultural applicator and, more particularly, relates to a kingpin assembly for a three-wheeled agricultural applicator that enhances turning and maneuverability of the agricultural applicator.

BACKGROUND OF THE INVENTION

Numerous types of agricultural applicators are available today. These can include a pull-type unit or a self-propelled unit. A certain known agricultural applicator is also referred to as a "floater." The floater is a large vehicle that uses oversized floatation tires to carry the vehicle across firm to muddy agricultural environments. One particular floater chassis assembly includes a pair of rear floatation tires and a single front floatation tire. The chassis assembly is configured to support one or more bulk storage tanks or bins of product for application in an agricultural environment, usually before planting in the spring or after harvest in the fall. The type of agricultural product e.g., fertilizer, herbicide, pesticide, nutrients, etc. can vary. The floater can also be utilized to tow various agricultural implements. The oversize-tired agricultural applicator is generally desired for its ability to maneuver heavy loads over extremely rough and difficult agricultural terrain with minimal soil compaction.

However, certain known floater-type agricultural applicators have drawbacks. In particular, turning the typical three-wheeled agricultural applicator generally causes the front floatation tire to slide or rut dirt, particularly when turning the applicator around at the end of an agricultural field.

Thus, there is a need for an agricultural applicator (e.g., three-wheeled floater) that enhances the ability to maneuver a turn without causing undesired sliding of the applicator or rutting of the agricultural field.

SUMMARY OF THE INVENTION

The present invention provides a frame assembly for an agricultural applicator. The frame assembly includes a forward end relative to a forward direction of travel of the agricultural applicator. The frame assembly is mounted on a series of wheel assemblies that includes a single front wheel assembly having a front floatation tire. The front floatation tire generally includes a tread having a central crown extending a circumference of the front tire. The tread further includes a first tread face extending in one direction from the crown and a second tread face extending in a second direction from the crown opposite the first tread face. The frame assembly further includes a fork assembly mounted on the front wheel assembly. The fork assembly includes a kingpin extending upward therefrom, the kingpin having a central axis. The central axis of the kingpin is positioned at an angle from vertical. The angle of the kingpin dictates the angle of the fork assembly such that, when the fork assembly is positioned to steer the agricultural applicator in a straight direction of the travel, the front tire is positioned such that a first alignment of the crown of the front tire is generally vertical. When rotating the fork assembly to turn the agricultural applicator a turn angle from the straight-forward direction of travel, the front tire is positioned in a second alignment such that the alignment of the crown of the front tire is aligned at a roll angle from vertical.

A preferred frame assembly includes a front bearing structure attached at the forward end of the frame assembly. The front bearing structure includes a spindle housing, the spindle housing including an opening aligned along a central axis. The opening in the spindle housing is configured to receive the kingpin. The alignment of the spindle housing dictates the alignment of the kingpin. Accordingly, the central axis of the opening in the spindle housing and the kingpin is aligned at an angle with respect to vertical. The front bearing structure preferably supports the central axis of spindle housing at a six-degree angle from vertical. Accordingly, the central axis of the kingpin is aligned at a six-degree angle rearward from vertical, relative to the forward direction of travel. At this preferred kingpin alignment and when turning the agricultural applicator at a turn angle of 45-degrees, one of the first and second tread faces of the front tire is positioned generally parallel with the ground surface.

Another embodiment of the present invention provides an agricultural applicator that includes a frame assembly in support of a drive unit. The frame assembly is mounted on a series of wheel assemblies that includes at least one front wheel assembly. The at least one front wheel assembly includes an oversized floatation tire. The oversized floatation tire includes a tread having a central crown extending a circumference of the front tire. The tread further includes a first tread face extending in one direction from the central crown and a second face extending in a second direction from the crown opposite the first tread face. The frame assembly includes a fork assembly mounted on the at least one front wheel assembly. A kingpin extends upward from the fork assembly along a central axis. A forward end of the frame assembly preferably includes a spindle housing having an opening configured to receive the kingpin. The kingpin is aligned along the central axis such that, when the agricultural applicator is moving in a straight direction of the travel, the oversized floatation tire at the front wheel assembly is positioned in a first alignment such that its central crown is generally vertical. When turning the agricultural applicator a turn angle from the straight direction of travel, the oversized floatation tire of the front wheel assembly is positioned in a second alignment such that the central crown is aligned at a roll angle from vertical. A preferred embodiment of the kingpin and spindle housing is aligned at a six-degree angle in a rearward direction from vertical, relative to the forward direction of travel. At this kingpin alignment, when turning the agricultural applicator a turn angle of 45-degrees from the straight-forward direction of travel, one of the first and second tread faces of the front tire is positioned generally parallel with the ground surface in a direction of the turn angle of the fork assembly.

Yet another embodiment of the present invention provides a method of turning a three-wheeled agricultural applicator. The three-wheeled agricultural applicator generally includes a frame assembly having a fork assembly mounted on a single front wheel assembly. The fork assembly includes a kingpin extending generally upwards therefrom. The front wheel assembly includes an oversized floatation tire. The oversized floatation tire includes a tread having a central crown extending a circumference of the tire. The tread further includes a first tread face extending in a first direction from the crown, and a second tread face extending in a second direction from the central crown opposite the first tread face. The method includes positioning a central axis of the kingpin at the angle with respect to vertical relative to the forward direction of travel; rotating the fork assembly so as to cause a desired turn angle of the agricultural applicator with respect to the straight-forward direction of travel; and rotating the central crown of the front tire by a roll angle from vertical in a direction of the desired turn angle of the three-wheeled agricultural applicator. The positioning step includes mounting a spindle housing having an opening with a central axis and aligning the central axis of the spindle housing opening at the angle to position the kingpin. The applicator further includes a steering plate directly connected at the top surface of the kingpin. The preferred rotating step thus includes rotating the steering plate and connected fork assembly to cause a desired turn angle of the agricultural applicator.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates a partial isometric view of a frame of a three-wheeled agricultural applicator having a kingpin assembly in accordance with the present invention.

FIG. 2 illustrates a partial side view of the kingpin assembly of the three-wheeled agricultural applicator of FIG. 1.

DETAILED DESCRIPTION OF THE PREFERRED EMBODIMENTS

Figure 3:
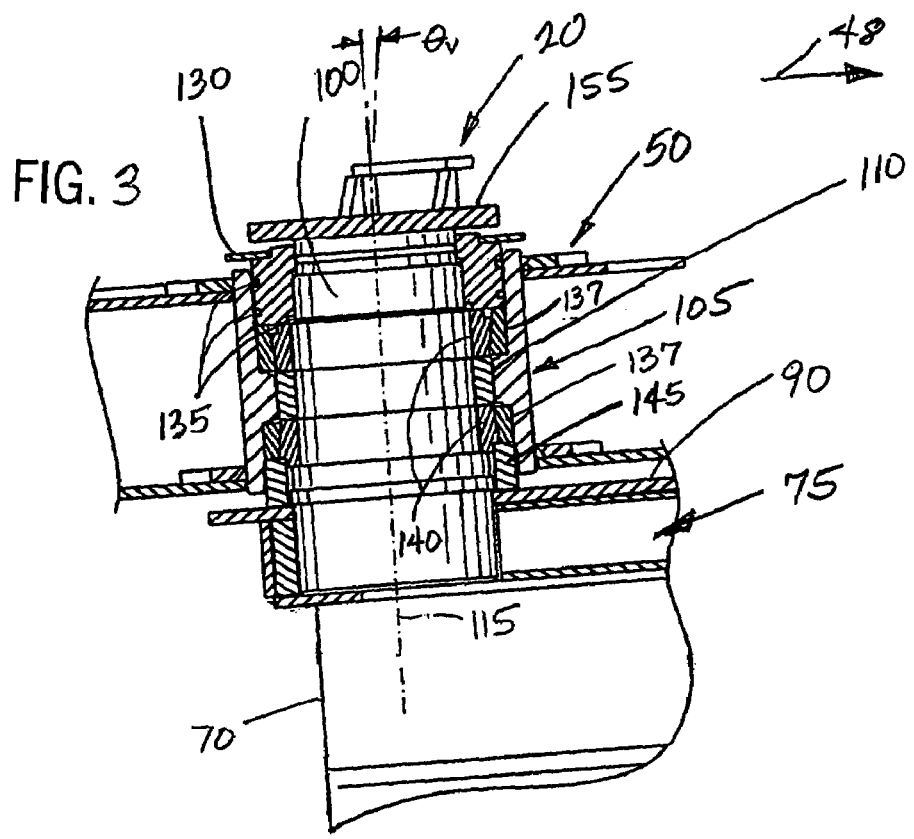
FIG. 3 illustrates a detailed cross-section view of agricultural applicator the kingpin assembly along line 3—3 in FIG. 1.

A wide variety of vehicles could be constructed in accordance with the invention defined by the claims. Hence, while preferred embodiments of a kingpin assembly in accordance with the invention will now be generally described with reference to an agricultural applicator, it should be understood that the invention is in no way so limited. The enclosure can be configured for any type of vehicle (e.g., motorcycle, recreational vehicle, etc).

FIGS. 1 and 2 illustrate a kingpin assembly 20 in accordance with the present invention mounted on an agricultural applicator 25. The agricultural applicator 25 generally includes a cab (not shown) and a drive unit 30 supported by a frame assembly 35. The frame assembly 35 is mounted on the series of wheel assemblies. The preferred agricultural applicator is a floater-type agricultural applicator having a pair of rear wheel assemblies (not shown) and at least one front wheel assembly 40. The at least one front wheel assembly 40 generally includes a front shaft 42 mounted with a front wheel or tire 44. Although a three-wheeled floater-type agricultural applicator is shown, it should be understood that the number of wheel assemblies (e.g., a two-wheeled or a four-wheeled machine) can vary.

Referring to FIG. 2, the frame assembly 35 generally includes a first frame side support 45 and a second frame side support (not shown). The first frame side support 45 extends on one side of a central longitudinal axis (not shown) defined by the frame assembly 35 in a straight-forward direction of travel (illustrated by arrow 48) of the agricultural applicator 25. The second frame side support extends on the opposite side of the longitudinal axis relative to the first frame side support 45.

Referring to FIGS. 1 and 2, the frame assembly 35 further includes a front bearing structure or plate 50 that is raised relative to the first frame side support 45. The raised front bearing structure 50 is supported from the first frame side support 45 by a first angled support arm 55. A second angled support (not shown) interconnects the second frame side support (not shown) to the front bearing structure 50 in a similar manner. The first angled support arm 55 and the second angled support arm (not shown) position the raised front bearing structure 50 at an angle ($\theta_h$) with respect to horizontal.

The frame assembly 35 further includes a fork assembly 60 that supports the front bearing structure 50 of the frame assembly 35 on the front wheel assembly 40. The fork assembly 60 generally includes a first fork 65 and a second fork 70 and a yoke portion 75 extending therebetween. The first and second forks 65 and 70 extend in a generally perpendicular direction downward from the yoke portion 75. The free end 80 of the first fork 65 and the free end (not shown) of the second fork 70 mount on the front shaft 42 of the front wheel assembly 40. The front wheel 44 is mounted at a generally central position along the front shaft 42 between the first and second forks 65 and 70.

The yoke portion 75 further includes an upper surface 90. Extending upward from the upper surface 90 of the yoke portion 75 is the kingpin assembly 20 in accordance with the present invention. As illustrated in FIGS. 2 and 3, he kingpin assembly 20 generally includes a kingpin 100 fastened (e.g., welded, etc.) to the upper surface 90 of the yoke portion 75 of the fork assembly 60. The kingpin 100 is configured to rotatably couple the fork assembly 60 and mounted front wheel assembly 40 with the front bearing structure 50 of the frame assembly 35.

Referring to FIGS. 1–3, the front bearing structure 50 includes a spindle housing 105 to receive the kingpin 100. As illustrated in FIG. 3, the spindle housing 105 includes an opening or borehole 110 extending therethrough. The spindle housing 105 is attached to the front bearing structure 50 such that a central axis 115 of the opening 110 is positioned at an angle ($\theta_v$) with respect to vertical. The angle ($\theta_v$) is in a rearward direction from vertical relative to the straight-forward direction of travel 48 of the agricultural applicator 25. The preferred spindle housing 105 is positioned such that the central axis of the opening 110 is at a preferred angle ($\theta_v$) of about six degrees (±0.5degrees) from vertical. The kingpin 100 of the fork assembly 60 mounts in the spindle housing 105 of the front bearing structure 50 of the frame assembly 35. The angle of the spindle housing 105 dictates the angle ($\theta_v$) of the kingpin 100 and respective fork assembly 60. Accordingly, the kingpin 100 is positioned in the spindle housing 105 at the preferred angle ($\theta_v$) of six degrees with respect to vertical.

Referring to FIG. 3, the kingpin assembly 20 further includes a torque plate 130 and a series of O-rings 135, bearings 137, cones 140, and seals 145 configured in a known manner such that the kingpin 100 and attached fork assembly 60 rotate with respect to the front bearing structure 50 of the frame assembly 35. The kingpin 100 is secured in the spindle housing 105 of the front bearing structure 50 by any known kingpin fastener (e.g., weld, bolt, etc.).

Referring to FIGS. 1–3, a steering plate 155 is fastened to a top of the kingpin 100 by a series of steering plate fasteners 160. The steering plate 155 is configured to receive a well-known left-hand side steering actuator and a well-known right-hand side steering actuator (not shown), e.g., hydraulic cylinder, pneumatic cylinder, etc., in a known manner. The left-hand and right-hand steering actuators are connected to a steering wheel in a cab (not shown) of the agricultural applicator 25 in a known manner such that rotation of the steering wheel is operable to extend or retract the left-hand and right-hand steering actuators so as to rotate the steering plate 155 with respect to a straight-forward direction of travel 48. Accordingly, the rotating steering plate 155 rotates the attached kingpin 100 and fork assembly 60 about the spindle housing 105 of the front bearing structure 50 to cause a desired turn angle of the agricultural applicator 25.

Figure 4:
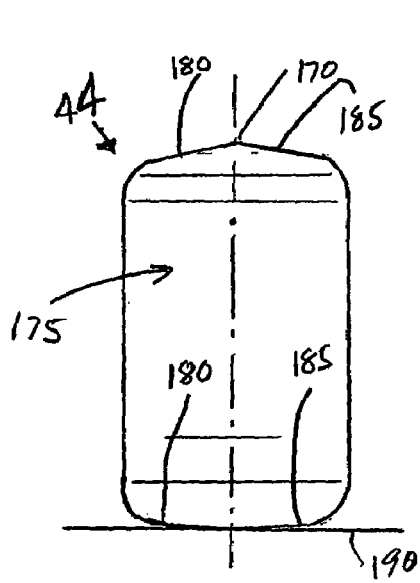
FIG. 4 illustrates a position of an oversized front tire of the three-wheeled agricultural applicator of FIG. 1 traveling in a straight-forward direction of travel.
Figure 5:
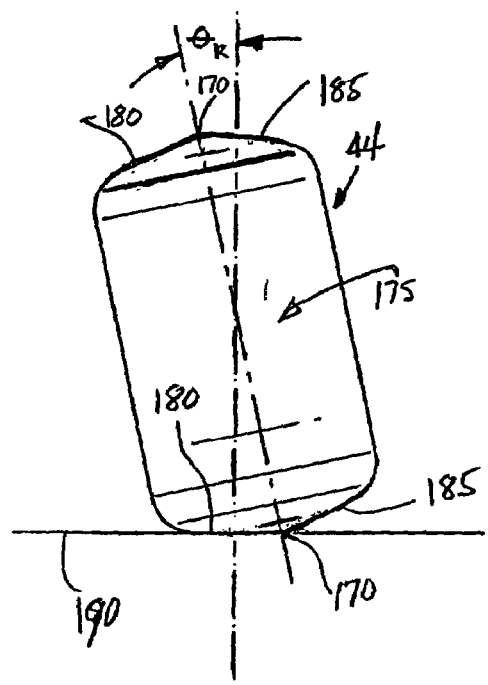
FIG. 5 illustrates the oversized front tire of FIG. 4 rotated a roll angle toward a desired turn angle of the three-wheeled agricultural applicator of FIG. 1.

Referring now to FIGS. 4 and 5, the preferred front tire or wheel 44 is a standard oversized floatation tire having a crown 170 centrally disposed along its tread 175 for a circumference of the tire 44. The standard tread is forty-three inches wide. The tread 175 includes a first tread face 180 extending in a generally downward direction from the crown 170 in a first lateral direction. The tread 175 further includes a second tread face 185 extending from the crown 170 in a second lateral direction opposite the first lateral direction of the first tread face 180. The first and second faces 180 and 185 are generally flat and angled from the crown with respect to horizontal. As illustrated in FIG. 4, the crown 170 is generally vertically aligned when the agricultural applicator and fork assembly 60 is steered in a straight-forward direction of travel 48.

Referring to FIG. 5, when the fork assembly is rotated from being steered in a straight-forward direction of travel 48, the position of the kingpin at the preferred angle of six degrees with respect to vertical causes the crown 170 of front oversized floatation tire 44 to roll a roll angle ($\theta_R$) from vertical toward the turn direction. The front oversized floatation tire 44 thus rolls the roll angle ($\theta_R$) about the crown 170 onto one of the first and second tread faces 180 and 185 in the direction of the turn. More specifically, as illustrated by FIG. 5, when turning the agricultural applicator 25 and fork assembly 60 a first turn angle from the straight-forward direction of travel 48, the front floatation tire 44 rolls about the crown 170 onto the first tread face 180 towards the first turn direction. In a similar manner, when turning the agricultural applicator 25 and fork assembly 60 a second turn angle (not shown) from the straight-forward direction of travel 48 opposite the first turn direction (See FIG. 5), the front oversized floatation tire 44 rolls the roll angle ($\theta_R$) about the crown 170 onto the second tread face 185 towards the second turn direction.

For a standard front floatation tire 44 turning at angle of about forty-five degrees from a straight-forward direction of straight travel 48, the six-degree angle of the kingpin 100 causes the front floatation tire 44 to roll a roll angle ($\theta_R$) towards the turn direction such that one of the first or second tread faces 180 and 185 of the front floatation tire 44 is generally parallel with a flat ground surface 190. The parallel alignment of the first or second tread faces 180 and 185 with the flat ground surface 190 enhances contact of the front tire 44 with the ground surface 190. Thereby, the roll angle of the front floatation tire 44 enhances contact of the front floatation tire 44 with a flat ground surface, and thus reduces undesired sliding and rutting by the front tire 44.

The fork assembly 60 and kingpin assembly 20 of the present invention do not require any "trail" such that the bearing of the front tire 44 is located behind the fork assembly 60.

Many changes and modifications could be made to the invention without departing from the spirit thereof. The scope of these changes will become apparent from the appended claims.

We claim:

1. A frame assembly of a three-wheeled agricultural applicator, the frame assembly having a forward end relative to a straight-forward direction of travel of the agricultural applicator, the frame assembly mounted on three wheel assemblies, the three wheel assemblies including a single front wheel assembly having a front tire, the front tire including a tread having a central crown extending a circumference of the front tire, the tread further including a first tread face generally extending in one direction from the crown and a second face generally extending in a second direction from the crown opposite the first tread face, the frame assembly comprising:

a fork assembly mounted on the single front wheel assembly;

a kingpin extending upward from the fork assembly, the kingpin having a longitudinal axis, the longitudinal axis of the kingpin being located at an angle from vertical, a spindle housing mounted at the forward end of the frame assembly, the spindle housing including an opening with a central axis configured to receive the kingpin, a steering plate fastened to the kingpin and being connectable to a steering actuator, wherein when the agricultural applicator is moving in the straight-forward direction of travel, the front tire is positioned in a first alignment such that the crown of the front tire is generally vertical, wherein when turning the agricultural applicator a turn angle from the straight-forward direction of travel, the front tire is positioned in a second alignment such that the crown of the front tire is aligned at a roll angle from vertical, wherein the central axis of the opening in the spindle housing is aligned approximately at an angle of six degrees in a rearward direction from vertical relative to the straight-forward direction of travel of the agricultural applicator, and wherein rotation of the steering plate by the steering actuator causes a respective rotation of the kingpin and the attached fork assembly.

2. The frame assembly as recited in claim 1, wherein the longitudinal axis of the kingpin is aligned approximately at a six degree angle in a rearward direction from vertical relative to a straight-forward direction of travel of the agricultural applicator.

3. The frame assembly as recited in claim 1, further comprising:

a front bearing structure mounted to the forward end of the frame assembly, the spindle housing mounted to the front bearing structure.

4. The frame assembly as recited in claim 3, further comprising:

a first frame side support located on one side of a longitudinal axis defined by the frame assembly in the straight-forward direction of travel, and a second frame side support located on the other side of the longitudinal axis; and a first angle support arm interconnecting the first frame side support to the front bearing structure, and a second angle support arm interconnecting the second frame side support to the front bearing structure, wherein the front bearing structure is positioned at an upward angle of about six degrees from horizontal.

5. The frame assembly as recited in claim 1, wherein at the turn angle of approximately 45-degrees, one of the first and second tread faces is positioned generally parallel with the ground surface.

6. An agricultural applicator, comprising:

a drive unit;

a plurality of wheel assemblies, the plurality of wheel assemblies including at least one front wheel assembly, the at least one front wheel assembly including a front tire, the front tire including a tread having a central crown extending a circumference of the front tire, the tread further including a first tread face extending in one direction from the crown at an acute angle to horizontal and a second tread face extending in a second direction from the crown at an acute angle to horizontal opposite the first tread face;

a frame assembly in support of the drive unit on the plurality of wheel assemblies, the frame assembly having a forward end and a rearward end relative to a straight-forward-direction of travel of the agricultural applicator, the frame assembly including:

at least one fork assembly mounted on the at least one front wheel assembly;

a kingpin extending upward from the fork assembly, the kingpin having a longitudinal axis;

a spindle housing including an opening with a central axis, the opening configured to receive the kingpin, wherein the central axis of the opening in the spindle housing and the longitudinal axis of the kingpin are positioned at an angle from vertical, wherein when the agricultural applicator is moving in the straight-forward direction of the travel, the front tire is positioned in a first alignment such that the crown of the front tire is generally perpendicular relative to horizontal, and wherein when turning the agricultural applicator a turn angle from the straight-forward direction of travel, the front tire is positioned in a second alignment such that the crown of the front tire is aligned at a roll angle from vertical and such that the one of the first and second tread faces is positioned generally parallel with the ground surface.

7. The frame assembly as recited in claim 6, wherein the longitudinal axis of the kingpin is aligned approximately at a six degree angle in a rearward direction from vertical relative to the straight-forward direction of the travel of the agricultural applicator.

8. The frame assembly as recited in claim 6, wherein the central axis of the opening in the spindle housing is aligned approximately at an angle of six degrees in a rearward direction from vertical relative the straight-forward direction of travel of the agricultural applicator.

9. The frame assembly as recited in claim 6, further comprising:

a steering plate directly fastened to a top of the kingpin and being connectable to a steering actuator, wherein rotation of the steering plate by the steering actuator causes a respective rotation of the kingpin and the attached fork assembly.

10. The frame assembly as recited in claim 6, further comprising:

a front bearing structure mounted to the forward end of the frame assembly, the spindle housing mounted to the front bearing structure.

11. The frame assembly as recited in claim 10, further comprising:

a first frame side support located on one side of a longitudinal axis defined by the frame assembly in the straight-forward direction of travel, and a second frame side support located on the other side of the longitudinal axis; and a first angle support arm interconnecting the first frame side support to the front bearing structure, and a second angle support arm interconnecting the second frame side support to the front bearing structure, wherein the front bearing structure is positioned at an upward angle of about six degrees from horizontal.

12. A method of turning an agricultural applicator from a straight-forward direction of travel, the applicator including a frame assembly mounted on at least one front wheel assembly on a ground surface, the at least one front wheel assembly including a front tire, the front tire including a tread having a central crown extending a circumference of the front tire, the tread further including a first tread face extending in one direction from the crown and a second tread face extending in a second direction from the crown opposite the first tread face, the frame assembly including a front fork assembly mounted on the front wheel assembly, the fork assembly including a kingpin having a longitudinal axis with respect to vertical, the method comprising the steps of:

connecting the kingpin to a yoke portion of the fork assembly;

positioning the longitudinal axis of the kingpin at approximately a six-degree angle with respect to vertical in a rearward direction with respect to the straight direction of travel;

fastening a steering plate to the kingpin, the steering plate connectable to a steering actuator;

moving the agricultural applicator in the straight-forward direction of travel such that an alignment of the crown of the front tire is generally perpendicular relative to horizontal;

rotating the fork assembly so as to cause a desired turn angle of the agricultural applicator with respect to the straight-forward direction of travel, the rotating step includes rotating the steering plate with the steering actuator to cause the desired turn angle of the three-wheeled agricultural applicator; and rolling the front tire such that the alignment of the crown is rolled a roll angle from vertical in a direction of the turn angle.

13. The method as recited in claim 12, wherein when the turn angle is 45 degrees from a straight direction of travel, and wherein the rolling step includes rolling onto one of the first and second tread faces in a direction of the desired turn angle of the front tire in response to rotating the fork assembly, such that one of the first and second tread faces is generally aligned parallel to the flat ground surface.

* * * * *